United States Patent
Clair et al.

(10) Patent No.: US 12,448,108 B2
(45) Date of Patent: Oct. 21, 2025

(54) METHOD FOR MANUFACTURING A STRUCTURAL ELEMENT FOR A FUSELAGE OF AN AIRCRAFT

(71) Applicant: Airbus Operations GmbH, Hamburg (DE)

(72) Inventors: Scott Clair, Hamburg (DE); Andreas Jespersen, Hamburg (DE); Paul Jörn, Hamburg (DE); Norbert Heltsch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 404 days.

(21) Appl. No.: 17/868,162

(22) Filed: Jul. 19, 2022

(65) Prior Publication Data

US 2023/0026741 A1   Jan. 26, 2023

(30) Foreign Application Priority Data

Jul. 22, 2021  (EP) ..................... 21187300

(51) Int. Cl.
 *B64C 1/12* (2006.01)
 *B29C 70/22* (2006.01)
 (Continued)

(52) U.S. Cl.
 CPC ............ *B64C 1/12* (2013.01); *B29C 70/22* (2013.01); *B29C 70/30* (2013.01);
 (Continued)

(58) Field of Classification Search
 None
 See application file for complete search history.

(56) References Cited

U.S. PATENT DOCUMENTS

| | | |
|---|---|---|
| 2018/0036959 A1 | 2/2018 | Cowart |
| 2020/0139643 A1 | 5/2020 | Ogale |

(Continued)

FOREIGN PATENT DOCUMENTS

| | | |
|---|---|---|
| CA | 2628261 A1 | 5/2007 |
| EP | 2 772 344 A1 | 9/2014 |

(Continued)

OTHER PUBLICATIONS

European Search Report for Application No. 21187300 dated Dec. 20, 2021.

(Continued)

*Primary Examiner* — Jacob T Minskey
*Assistant Examiner* — Adrien J Bernard
(74) *Attorney, Agent, or Firm* — KDW Firm PLLC

(57) ABSTRACT

A method for manufacturing a structural element for a fuselage of an aircraft. To improve the manufacture of structural elements, a method includes laying up textile material members on a mandrel to form a plurality of structural element preforms that are space apart along an extended direction of the mandrel. The structural element preforms form closed loops and are subsequently cured to obtain annular structural elements. The annular structural elements are used as basic building blocks for stiffening panel members or are directly used as structural frame elements reinforcing cut-outs in a fuselage for windows and/or doors.

13 Claims, 3 Drawing Sheets

(51) Int. Cl.
  *B29C 70/30* (2006.01)
  *B29K 105/00* (2006.01)
  *B29K 105/10* (2006.01)
  *B29L 31/30* (2006.01)
  *B64C 1/00* (2006.01)

(52) U.S. Cl.
  CPC .. *B29K 2105/102* (2013.01); *B29K 2105/253* (2013.01); *B29L 2031/3082* (2013.01); *B64C 2001/0072* (2013.01)

(56) References Cited

U.S. PATENT DOCUMENTS

2020/0338788 A1* 10/2020 Escowitz ............... B29B 11/12
2021/0206135 A1    7/2021 Webb

FOREIGN PATENT DOCUMENTS

| EP | 3 165 448 A1 | 5/2017 |
| KR | 101489292 B1 | 1/2015 |
| WO | 2007053362 A2 | 5/2007 |

OTHER PUBLICATIONS

European Office Action in EP Application No. 21187300.5 dated Jun. 17, 2025, 6 pages.

* cited by examiner

METHOD FOR MANUFACTURING A STRUCTURAL ELEMENT FOR A FUSELAGE OF AN AIRCRAFT

CROSS-REFERENCE TO RELATED APPLICATION

This application claims priority to EP Patent Application No. 21187300.5 filed Jul. 22, 2021, the entire disclosure of which is incorporated by reference herein.

TECHNICAL FIELD

The disclosure herein relates to a method for manufacturing a structural element for a fuselage of an aircraft. The disclosure herein relates further to specific structural parts that employ the structural element.

BACKGROUND

EP 3 165 448 B1 discloses a method for manufacturing an aperture surrounding frame. A single tubular braided member is cut and layed up around an inner mold. Subsequently, the tubular member is formed and cured to obtain the aperture surrounding frame.

Cut-outs in aircraft fuselages, such as for doors (be it passenger doors, cargo doors or the like) and windows, as well as the doors themselves usually have structural elements for reinforcement. The structural elements are usually manufactured separately and attached to the door, for example, by bolting. Thus, many reinforcement structures have a ring-like structure. Their manufacture is typically high-effort and therefore high cost.

SUMMARY

It is an object of the disclosure herein to improve the manufacture of structural elements. The object is achieved by the subject matter disclosed herein. Preferred embodiments are disclosed herein.

The disclosure herein provides a method for manufacturing a structural element for a fuselage of an aircraft, the method comprising:
  a) on a mandrel that extends in a longitudinal direction, laying up a plurality of textile material members so as to form at least one structural element preform next to each other;
  b) curing the structural element preform, so as to obtain a structural element.

Preferably, in step a) the textile material members are layed up on the mandrel such that a plurality of structural element preforms are spaced apart along the longitudinal direction.

Preferably, the mandrel is a split mandrel or half-size mandrel.

Preferably, the textile material members are layed up on a circumferential surface of the mandrel, so as to form a closed loop structural element preform. Preferably, in step b) the structural element preforms are cured to obtain an annular structural element.

Preferably, the method comprises a step c) in which the mandrel is removed by pulling off the structural elements from the mandrel or by moving separate portions of the mandrel relative to each other.

Preferably, in step a) the laying up is done by winding around the mandrel, automated fiber placement, automated tape layering of the textile material members.

Preferably, the textile material members are chosen from a group consisting of textile material, fiber composite material, tows, slit tape, fiber tape, non-crimp fabric, non-woven fabric, and prepregs.

Preferably, in step b) at least one structural element preform is layed up by laying up the textile material members on the mandrel such that the structural element preform is double-curved. Preferably, a first curvature is formed by continuously displacing the textile material members during laying up along the longitudinal axis up to a maximum displacement. Preferably, a second curvature is formed by laying up the textile material members around a circumferential surface of the mandrel.

Preferably, the first curvature is further formed by continuously displacing the textile material members during laying up in an opposite direction along the longitudinal axis from the maximum displacement until the textile material members form a closed loop structural element preform.

The disclosure herein provides a method for manufacturing a structural frame element for a cut-out in a fuselage, such as a window frame or a door frame, of an aircraft, the method comprising the step of performing a preferred method such that an annular structural element is formed that is adapted to be arranged to surround the cut-out in the fuselage and to be arranged in between skins of the fuselage.

The disclosure herein provides a method for manufacturing a stiffened structural panel element of an aircraft, the method comprising the steps of:
  a) performing the preferred method such that at least one annular structural elements is produced, the annular structural element extending along an element axis and circumferentially surrounding the element axis;
  b) providing a panel member;
  c) affixing the annular structural element to the panel member so as to obtain the structural panel element.

Preferably, in step c) the annular structural elements are affixed, so as to form a structural grid.

Preferably, in step c) the annular structural elements are affixed, so that adjacent annular structural elements engage each other at an engagement location. Preferably, the annular structural elements are fixed to each other at the engagement locations.

Preferably, the annular structural elements are affixed to the panel member by bonding, welding or bolting. Preferably, the annular structural elements are fixed to each other by bonding, welding or bolting.

The disclosure herein provides a structural frame element or a stiffened structural panel element obtainable by a preferred method.

The disclosed disclosure herein relates to the field of concepts and manufacturing of aircraft structural elements. The structural elements are preferably used in a composite substructure for cut-out (opening) reinforcement. Preferably thermoplastic matrix systems are used for the structural elements. In general, the substructures have a ring shape, meaning they circumferentially surround an axis in which the substructure extends. In other words, ring shape or annular does not imply that those parts are circular. Rather as used herein, any shape that surrounds a (central) element axis is ring-shaped or annular within the meaning of this disclosure.

The ideas disclosed herein are applicable to structural elements that previously were produced by manufacturing skin and stiffening elements, and were assembly mainly by bolting. According to the disclosure herein fewer parts are needed, which considerably reduces the assembly effort. For cut-outs, it is possible to replace the currently different concepts, for example the deep drawn elements for the waste water panel. Furthermore, the ideas herein are able to improve the manufacture of the backup structures of panels and doors that may be used to close-off the cut-outs. In terms of weight efficiency ring-like or annular structures as envisaged herein can offer a better performance e.g. due to better following the shape of the cut-out.

Typically, there are backup structures for reinforcement of the cut-out and backup structures for a door that closes the cut-out and has a panel that is supported by another backup structure. An important element of this idea is a (vertical flange) structural element that is of annular shape. The proposed concept is attractive for repetitive ring elements with roughly the same shape. Therefore, it is possible with the disclosure herein to manufacture large quantities in one-shot.

The benefits of the proposed solution include, but are not limited to, the following advantages. It should be noted that not all advantages must be realized at the same time or in the same amount.

The methods allow a significant reduction of parts (ideally main structural elements are reduced to one or two parts). The design is made of composite material and light-weight. The manufacturing effort can be reduced by an efficient part sub-assembly for doors, cut-outs and the like, by preferably co-consolidation or local over molding of the substructure. In case of thermosetting matrix material co-infusion is also possible.

The cut-out surround structure can be integrated directly on a panel/skin by local over molding or an autoclave process. If need be, flanges can be integrated into the reinforcement ring upfront for better integration into the pre-assembled structure in a second step (e.g. by bolting, bonding or welding. Faster processing times and less scrap can be achieved for single parts. In addition, the same can be achieved for the assembled part due to higher integration. With the ideas herein, the overall lead time can be reduced, in particular with respect to assembly time. Integration can be achieved without dust (carbon dust for example) when co-consolidating. The disclosure herein allows for a high production rate. The disclosed ideas are a manufacturing/technology approach that can be applied for almost all kinds of shell/panel structures that are supporting cut-outs.

One example are aircraft doors, such as hatches, bulk cargo doors, passenger (PAX) doors and cargo doors. Typically, a bulk door contains a panel, a grid and a surrounding edge member. The edge member is a ring structure. Several edge members may be layed up on a single mandrel for a fast and easy production of a large quantity of parts at the same time.

The layup of the material on the mandrel can be done with different processes, such as winding of tows (dry, wet etc.), automated fiber placement (AFP) slit tape, automated tape layering or manually. It is possible to use wet or dry materials (e.g. non-crimp fiber, fabric).

Further examples of application can be window frames or door frames. To achieve the needed shape of the ring-structures a sub-sequent machining (e.g. waterjet cutting or milling) may be applied. This allows to have rings that can be used as stiffener in double curved areas. Additionally, machining can be done in the needed angle and areas which are not needed can be cut away.

The ideas disclosed herein are particularly useful for double curved panel structures, since double curved elements usually lead to high effort for manufacturing several special parts. With the solution here, each part can be manufactured without unique tooling. The single part effort is mainly caused by the major process steps which are more or less the same as if one large integrated part is manufactured. Another benefit can be a faster layup and less scrap by manufacturing multiple parts one shot on one larger tool. This concept can be transferred to all ring-shaped structural elements, such as a panel with a reinforcing substructure that is made of rings that are connected to form a grid pattern for reinforcement. An example is an (iso)-grid formed by circles, squares or the like. These ring elements can be integrated by bonding or welding (e.g. if thermoplastic resin is used).

The rings are welded or molten together to form a larger structure. The ring elements can differ in shape, size, height, and/or their joining locations between the rings. The elements can act as load introduction (e.g. to connect beams) and allow a "dust-free" connection for assembly of later attached elements (modules) including tolerance compensation.

The ring elements can be connected to each other by connection of their surfaces by bonding, welding or bolting. Welding has the advantage of being fast and cheap. Using bonding agent allows for a filler from the ring web to the panel to which it is affixed. Bolting is an option, if a flange is available. Circular shapes that are made of or include thermoplastic resin may be affixed to the panel by rotation friction welding.

Possible materials for the ring elements include thermoset resin composites (bonding or co-bonding/curing), thermoplastic resin composites (welding can be done), combinations of thermosetting and thermoplastic resin, and short fiber reinforced materials in thermosetting or thermoplastic resin can be used for fillers.

BRIEF DESCRIPTION OF THE DRAWINGS

Embodiments of the disclosure herein are described in more detail with reference to the accompanying schematic drawings that are listed below.

DETAILED DESCRIPTION

Figure 1:
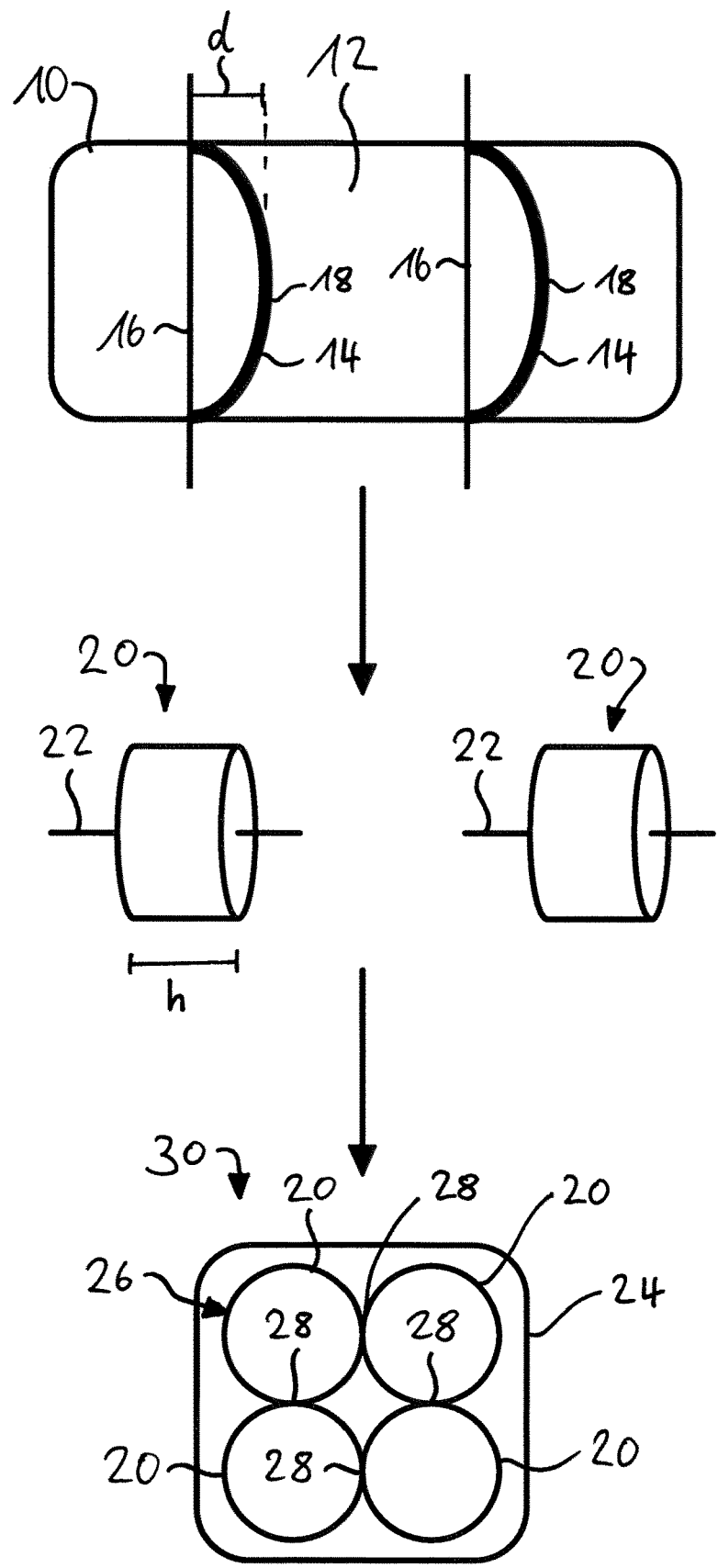
FIG. 1 depicts an embodiment of a method for manufacturing a stiffened structural panel element.

As depicted in FIG. 1, in a first step a plurality of textile material members are layed up on a mandrel 10. The mandrel 10 extends in a longitudinal direction (left-right direction in FIG. 1). The mandrel 10 has a circumferential surface 12 that is a forming surface for the textile material members. The textile material members may be tows or slit tape that is wound around the mandrel 10 or applied to the circumferential surface 12.

The textile material members are layed up in such a way that a plurality of structural element preforms 14 are generated. The structural element preforms 14 are spaced apart along the longitudinal direction. The structural element preforms 14 can be double curved.

A first curvature is formed by continuously displacing the textile material members along the longitudinal direction up to a maximum displacement d. In other words, the textile material members are progressively arranged outside of a cross-sectional plane 16 through the mandrel 10 that is orthogonal to the longitudinal direction until a desired maximum is reached. After that the textile material members are progressively brought back so that as a result the structural element preform 14 forms a closed loop 18.

A second curvature is formed by the circumferential surface 12 of the mandrel 10.

In a second step, the structural element preforms 14 are subsequently cured in order to obtain annular structural elements 20 that are suitable for reinforcing. The annular structural elements 20 extend along an element axis 22 which is also called height h. The annular structural elements 20 surround the element axis 22 in a circumferential direction.

Finally, the structural elements 20 are affixed to a panel member 24 such that the structural elements 20 form a structural grid 26. The structural elements 20 therefore are able to act as stiffening elements for the panel member 24. The structural elements 20 are arranged so that they engage each other at certain engagement locations 28. The structural elements 20 are fixed to each other at these engagement locations 28. As a result, a stiffened structural panel element 30 is obtained that may be used for manufacturing a fuselage or various doors of an aircraft.

Figure 2:
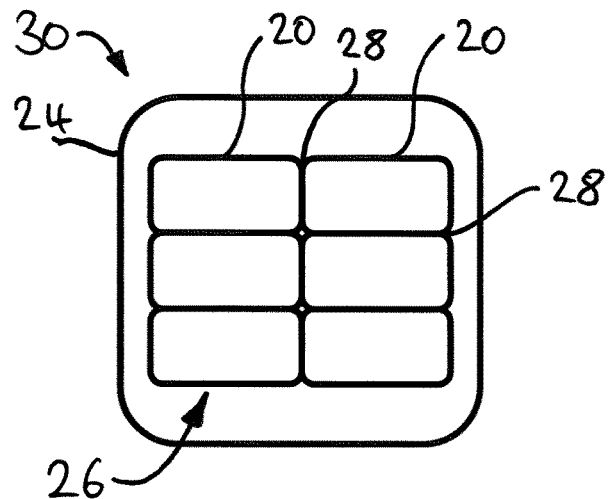
FIG. 2 depicts a variant of a stiffened structural panel element.

As depicted in FIG. 2, a variant of the stiffened structural panel element 30 comprises structural elements 20 having substantially rectangular cross-section. Other configurations, including double curved configurations are possible.

Figure 3:
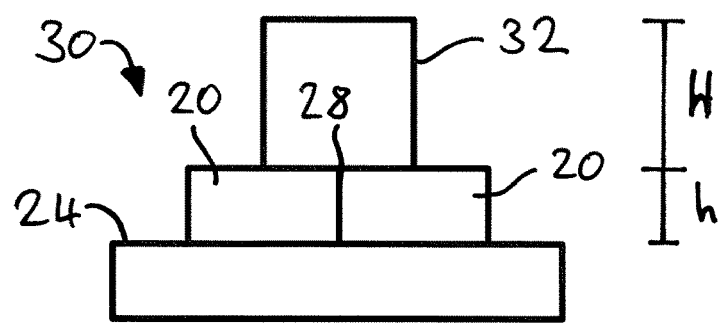
FIG. 3 depicts another variant of a stiffened structural panel element.

As depicted in FIG. 3, a variant of the stiffened structural panel element 30 may have structural elements 20 that have different height h. A larger structural element 32 may serve as a mount point for struts and other elements that are typically used in a fuselage. The larger structural element 32 has also a larger height H compared to the structural elements 20.

Figure 4:
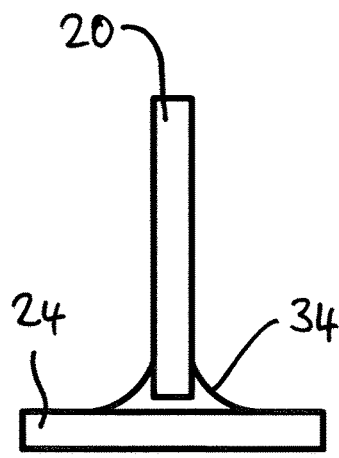
FIG. 4 depicts a joint between a structural element and a panel.

As depicted in FIG. 4, the structural element 20 can be affixed to the panel member 24 by an adhesive that forms a filler 34.

Figure 5:
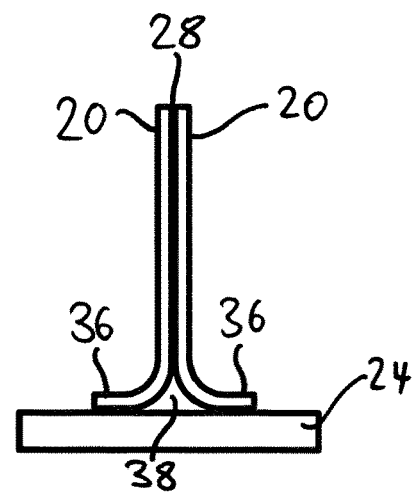
FIG. 5 depicts a joint between another structural element and the panel.

As depicted in FIG. 5, the structural element 20 may be manufactured with a flange portion 36. Adjacent structural elements 20 can be affixed to the panel member 24 by introducing adhesive into a cavity 38 defined between the adjacent structural elements 20 and the panel member 24. It is also possible to bolt the flange portions 36 to the panel member 24.

Figure 6:
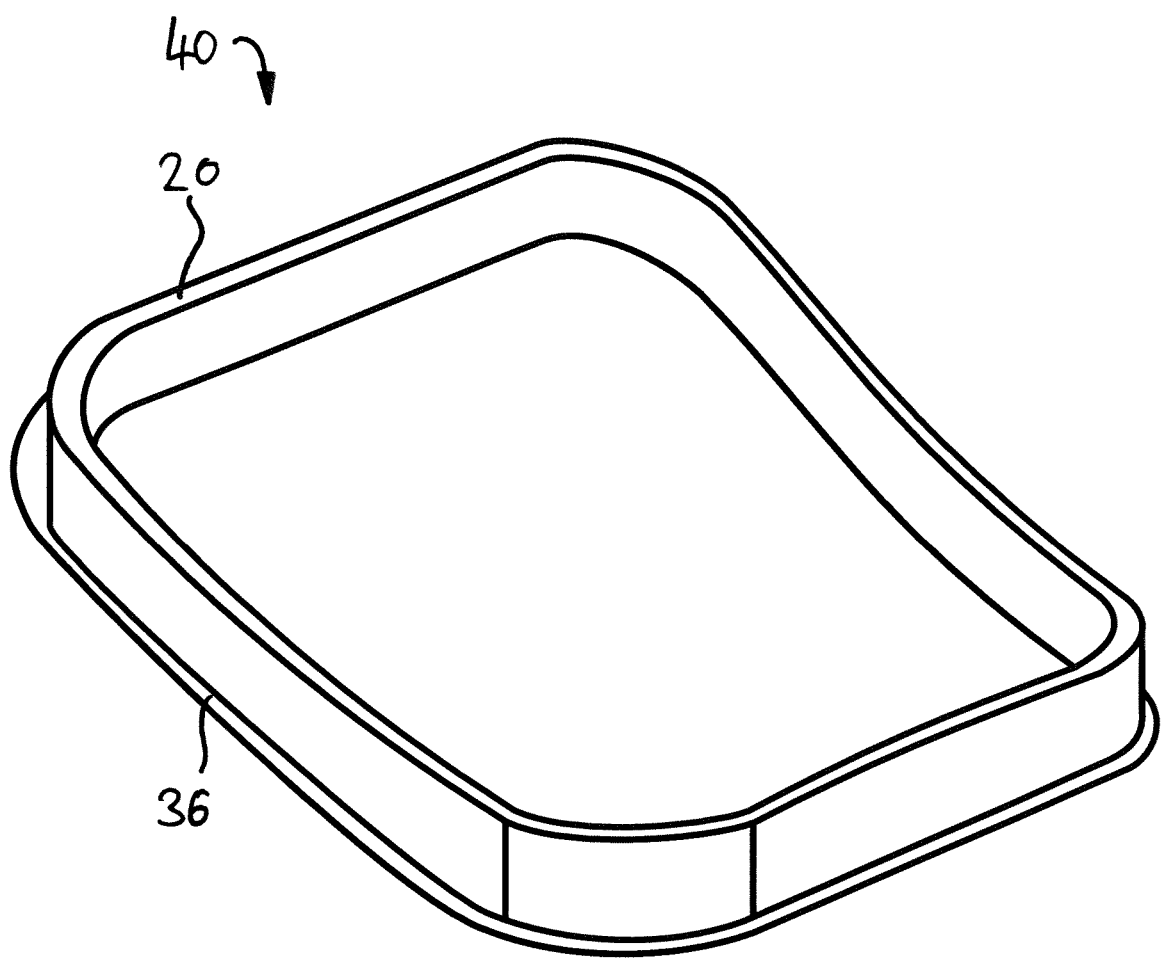
FIG. 6 depicts an embodiment of a structural frame element.

FIG. 6 depicts a structural frame element 40 that is also obtainable by the method described before. The structural frame element 40 may be a window frame or door frame that is installed in a fuselage to reinforce the cut-outs. The structural frame element 40 is double curved.

In order to improve the manufacture of structural elements (20), the disclosure herein proposes to lay up textile material members on a mandrel (10) so as to form a plurality of structural element preforms (14) that are space apart along an extended direction of the mandrel (10). The structural element preforms (14) form closed loops (18) and are subsequently cured to obtain annular structural elements (20). The annular structural elements (20) are used as basic building blocks for stiffening panel members (24) or are directly used as structural frame elements (40) reinforcing cut-outs in a fuselage for windows and/or doors.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 mandrel
12 circumferential surface
14 structural element preform
16 cross-sectional plane
18 closed loop
20 annular structural element
22 element axis
24 panel member
26 structural grid
28 engagement location
30 stiffened structural panel element
32 larger structural element
34 filler
36 flange portion
38 cavity
40 structural frame element
d maximum displacement
h height

The invention claimed is:

1. A method for manufacturing a structural element for a fuselage of an aircraft, the method comprising steps of:
   a on a mandrel that extends in a longitudinal direction, laying up a plurality of textile material members that are spaced apart next to each other along the longitudinal direction to form a plurality of structural element preforms; and
   b) curing the structural element preform, to obtain a structural element;
   wherein at least one structural element preform is laid up by laying up the textile material members on the mandrel such that the structural element preform is double curved, wherein a first curvature is formed by continuously displacing the textile material members during laying up along a longitudinal axis up to a maximum displacement outside of a cross-sectional plane through the mandrel that is orthogonal to the longitudinal direction, and a second curvature is formed by laying up the textile material members around a circumferential surface of the mandrel.

2. The method according to claim 1, wherein the mandrel is a split mandrel or half-size mandrel.

3. The method according to claim 1, wherein the textile material members are layed up on a circumferential surface of the mandrel to form a closed loop structural element preform, and in step b) the structural element preforms are cured to obtain an annular structural element.

4. The method according to claim 1, wherein in a step c) the mandrel is removed by pulling off the structural elements from the mandrel or by moving separate portions of the mandrel relative to each other.

5. The method according to claim 1, wherein in step a) the laying up is done by winding around the mandrel, automated fiber placement, automated tape layering of the textile material members.

6. The method according to claim 1, wherein the textile material members are selected from the group consisting of textile material, fiber composite material, tows, slit tape, fiber tape, non-crimp fabric, non-woven fabric, and prepregs.

7. The method according to claim 1, wherein the first curvature is further formed by continuously displacing the textile material members during laying up in an opposite direction along the longitudinal axis from the maximum displacement until the textile material members form a closed loop structural element preform.

8. A method for manufacturing a structural frame element for a cut-out in a fuselage of an aircraft, the method comprising a step of performing a method according to claim 3 such that an annular structural element is formed that is configured to be arranged to surround the cut-out in the fuselage and to be arranged on a skin or in between skins of the fuselage.

9. A method for manufacturing a stiffened structural panel element of an aircraft, the method comprising steps of:

a) performing the method according to claim 3 such that at least one annular structural elements is produced, the annular structural element extending along an element axis and circumferentially surrounding the element axis;

b) providing a panel member; and c) affixing the annular structural element to the panel member to obtain the structural panel element.

10. The method according to claim 9, wherein in step c) the annular structural elements are affixed to form a structural grid.

11. The method according to claim 9, wherein in step c) the annular structural elements are affixed so that adjacent annular structural elements engage each other at an engagement location, and the annular structural elements are fixed to each other at the engagement locations.

12. The method according to claim 11, wherein the annular structural elements are affixed to the panel member by bonding, welding or bolting, and/or the annular structural elements are fixed to each other by bonding, welding or bolting.

13. A structural frame element or a stiffened structural panel element obtained by the method according to claim 8.

* * * * *